US012695998B2

(12) United States Patent 
Yamada

(10) Patent No.: US 12,695,998 B2 
(45) Date of Patent: Jul. 28, 2026

(54) ONBOARD IMAGING DEVICE

(71) Applicant: TOYOTA JIDOSHA KABUSHIKI KAISHA, Aichi (JP)

(72) Inventor: Yukihisa Yamada, Seto (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 47 days.

(21) Appl. No.: 19/019,467

(22) Filed: Jan. 14, 2025

(65) Prior Publication Data

US 2025/0240536 A1      Jul. 24, 2025

(30) Foreign Application Priority Data

Jan. 22, 2024    (JP) ................................. 2024-007339

(51) Int. Cl.
| | |
|---|---|
| *H04N 23/75* | (2023.01) |
| *G06T 5/73* | (2024.01) |
| *G06T 5/92* | (2024.01) |
| *H04N 23/741* | (2023.01) |
| *B60R 1/27* | (2022.01) |

(52) U.S. Cl.
CPC .............. *H04N 23/75* (2023.01); *G06T 5/73* (2024.01); *G06T 5/92* (2024.01); *H04N 23/741* (2023.01); *B60R 1/27* (2022.01); *G06T 2207/20192* (2013.01); *G06T 2207/20208* (2013.01)

(58) Field of Classification Search
CPC ...... H04N 23/75; H04N 23/741; H04N 23/07; G06T 5/73; G06T 5/92; G06T 2207/20192; G06T 2207/20208; B60R 1/27
See application file for complete search history.

(56) References Cited

U.S. PATENT DOCUMENTS

| | | | | |
|---|---|---|---|---|
| 2016/0275683 A1* | 9/2016 | Sakano | .................. | H04N 7/181 |
| 2018/0342082 A1* | 11/2018 | Lewis | .................. | H04N 17/002 |
| 2022/0041105 A1* | 2/2022 | Jochmann | ................. | B60R 1/26 |
| 2025/0166146 A1* | 5/2025 | Yasui | .................. | H04N 23/741 |
| 2025/0211701 A1* | 6/2025 | Han | ......................... | H04N 1/60 |

FOREIGN PATENT DOCUMENTS

| | | | | | |
|---|---|---|---|---|---|
| JP | 2008131250 A | * | 6/2008 | ............. | H04N 5/225 |
| JP | 4803450 B2 | | 10/2011 | | |
| JP | 2011-259087 A | | 12/2011 | | |

* cited by examiner

*Primary Examiner* — Nhan T Tran

(74) *Attorney, Agent, or Firm* — HAUPTMAN HAM, LLP

(57) ABSTRACT

An onboard imaging device for capturing a situation around a vehicle includes an onboard camera provided on the vehicle and directed towards a surrounding of the vehicle; and a control unit configured to control the onboard camera to perform image processing including dynamic range processing and edge enhancement processing applied to an image captured by the onboard camera. The onboard camera has an optical axis adjustment mode for adjusting an optical axis using the captured image. The control unit controls the onboard camera to relax at least one of the dynamic range processing and the edge enhancement processing when the onboard camera is in the optical axis adjustment mode, compared to when the onboard camera is not in the optical axis adjustment mode.

2 Claims, 4 Drawing Sheets

ONBOARD IMAGING DEVICE

CROSS-REFERENCE TO RELATED APPLICATION

This application is based upon and claims the benefit of priority from Japanese Patent Application No. 2024-007339, filed on Jan. 22, 2024, the entire contents of which are incorporated herein by reference.

TECHNICAL FIELD

The present disclosure relates to an onboard imaging device.

BACKGROUND

Conventionally, a color target position determination device is known that reduces color effects occurring in captured images of a color target composed of different color combinations under a light source (for example, Japanese Patent Application Laid-Open No. 2011-259087).

SUMMARY

Generally, image processing including dynamic range processing and edge enhancement processing is applied to captured images of an onboard camera so that an occupant of the vehicle can more easily view the captured images displayed on an in-vehicle display. However, when adjusting an optical axis of the onboard camera using the captured images, the results of such image processing may become noise, making it difficult to properly adjust the optical axis.

An example of the present disclosure is an onboard imaging device for capturing a situation around a vehicle, including: an onboard camera provided on the vehicle and directed towards a surrounding of the vehicle; and a control unit configured to control the onboard camera to perform image processing including dynamic range processing and edge enhancement processing applied to a captured image captured by the onboard camera. The onboard camera has an optical axis adjustment mode for adjusting an optical axis using the captured image, and the control unit controls the onboard camera to relax at least one of the dynamic range processing and the edge enhancement processing when the onboard camera is in the optical axis adjustment mode, compared to when the onboard camera is not in the optical axis adjustment mode.

According to the onboard imaging device according to an example of the present disclosure, the onboard camera is controlled to relax at least one of the dynamic range processing and the edge enhancement processing when the onboard camera is in the optical axis adjustment mode, compared to when the onboard camera is not in the optical axis adjustment mode. This reduces an impact of image processing applied to make the captured images easier for a vehicle occupant to view on an in-vehicle display, when using the captured images to adjust the optical axis of the onboard camera. Therefore, according to the onboard imaging device of the present disclosure, it is possible to optimize the optical axis adjustment of the onboard camera that performs image processing to make the captured images easier for the vehicle occupant to view on the in-vehicle display.

In some examples, the control unit, in the optical axis adjustment mode of the onboard camera, may adjust the optical axis using the captured image processed with the image processing in which at least one of the dynamic range processing and the edge enhancement processing is relaxed with a first setting, and may adjust the optical axis using the captured image processed with the image processing in which at least one of the dynamic range processing and the edge enhancement processing is relaxed with a second setting having a smaller degree of relaxation than the first setting, if a target position for adjusting the optical axis cannot be recognized using the captured image processed with the image processing in which at least one of the dynamic range processing and the edge enhancement processing is relaxed with the first setting.

According to some aspects of the present disclosure, it is possible to optimize the optical axis adjustment of the onboard camera that performs image processing to make the captured images easier for the vehicle occupant to view on an in-vehicle display.

DETAILED DESCRIPTION

Hereinafter, an example of the present disclosure will be described with reference to the drawings.

Figure 1:
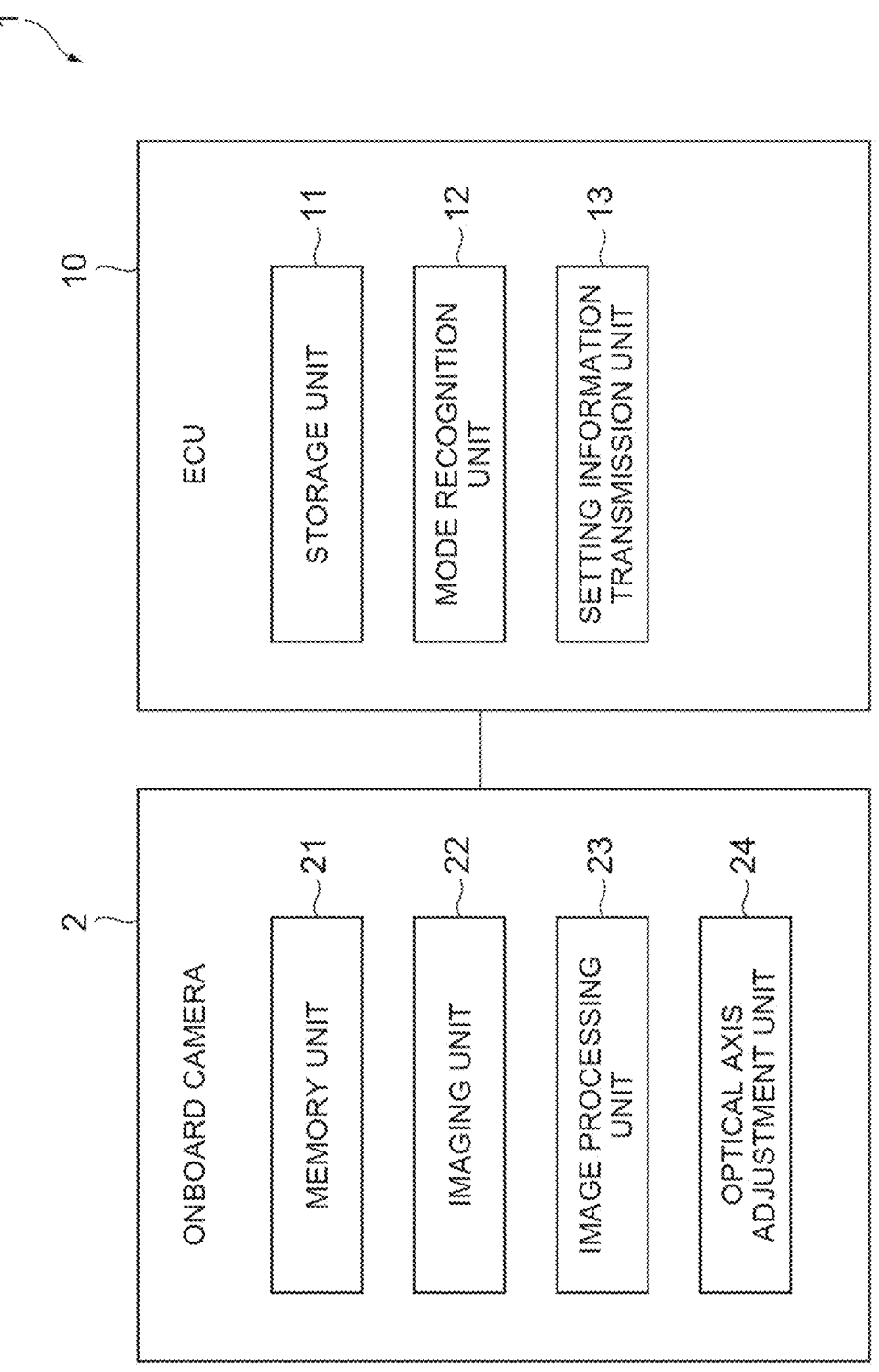
FIG. 1 is a block diagram illustrating a schematic configuration of an onboard imaging device according to an example.

FIG. 1 is a block diagram illustrating a schematic configuration of an onboard imaging device according to an example. An onboard imaging device 1 is mounted on a vehicle. The vehicle is, for example, a passenger car. The vehicle may be configured to be capable of performing autonomous driving control or driving support control.

As shown in FIG. 1, the onboard imaging device 1 includes an ECU (Electronic Control Unit) 10 and an onboard camera 2. The ECU 10 is an electronic control unit that controls the onboard camera 2. The ECU 10 is, for example, an electronic control unit for a panoramic view monitor. The ECU 10 is communicably connected to the onboard camera 2.

The ECU 10 includes a CPU (Central Processing Unit), ROM (Read Only Memory), RAM (Random Access Memory), CAN (Controller Area Network) communication circuit, and the like. The ECU 10 controls hardware based on a signal output from the CPU and realizes functions of the ECU 10 described later. As a more specific example of operation, the ECU 10 operates the CAN communication circuit to input and output data, stores the input data in the RAM, loads programs stored in the ROM into the RAM, and executes the programs loaded into the RAM. The ECU 10 may be composed of a plurality of electronic units. Some functions of the ECU 10 may be executed by a server communicable with the vehicle.

The onboard camera 2 is an imaging device that captures a situation around the vehicle. The onboard camera 2 includes, for example, a front camera, a rear camera, and a pair of left and right side-view cameras. The front camera is provided on a front bumper of the vehicle, for example, and captures an image of the surroundings in front of the vehicle. The rear camera is provided on a rear bumper of the vehicle, for example, and captures an image of the surroundings behind the vehicle. The side-view cameras are provided near door mirrors of the vehicle, for example, and capture images of the surroundings on the sides of the vehicle. The onboard camera 2 may have a wide-angle field of view and may capture an image of the vehicle body.

The onboard camera 2 has an optical axis adjustment mode for adjusting an optical axis using the captured image. The onboard camera 2 is configured to enable adjustment (calibration) of the optical axis using a captured image of a predetermined target. The optical axis adjustment of the onboard camera 2 is performed, for example, at a production factory during vehicle production or at a maintenance factory after vehicle sales, with the vehicle stopped at a predetermined position and direction relative to a target installed at a predetermined position.

FIG. 2A, FIG. 2B, FIG. 3A and FIG. 3B illustrate examples of predetermined targets. The target is composed of a pattern of two different colors (white and black in this case). By detecting the boundary between the two different colors (for example, the center point of the pattern) from the captured image, a target position used for optical axis adjustment is detected. The target is placed at least at two locations within the field of view of the onboard camera 2 on the floor of the work area. The target is placed so that the coordinates of the target position are known in a world coordinate system. Coordinate transformation between the world coordinate system and the camera coordinate system can be performed using known methods.

The two or more targets may include, for example, a pair of targets placed at a wider interval than the full width of the vehicle in front of the vehicle, and a target placed in front of the vehicle. The arrangement of the two or more targets is not limited to this example.

Here, the captured image of the onboard camera 2 may be displayed on an in-vehicle display (not shown) for viewing by the vehicle occupant. In this case, image processing including dynamic range processing and edge enhancement processing is generally applied to make the captured image easier for the vehicle occupant to view. Dynamic range processing means image processing that reduces overly bright white-out areas and overly dark black-out areas in the captured images by simultaneously capturing an image with a long shutter speed and an image with a short shutter speed and superimposing them. Dynamic range processing is also known as wide dynamic range (WDR) or high dynamic range (HDR). Edge enhancement processing means image processing that corrects the brightness change along a boundary (edge) where the brightness changes by a certain amount or more in the captured image to make the brightness change appear larger than it actually is.

Figure 2B:
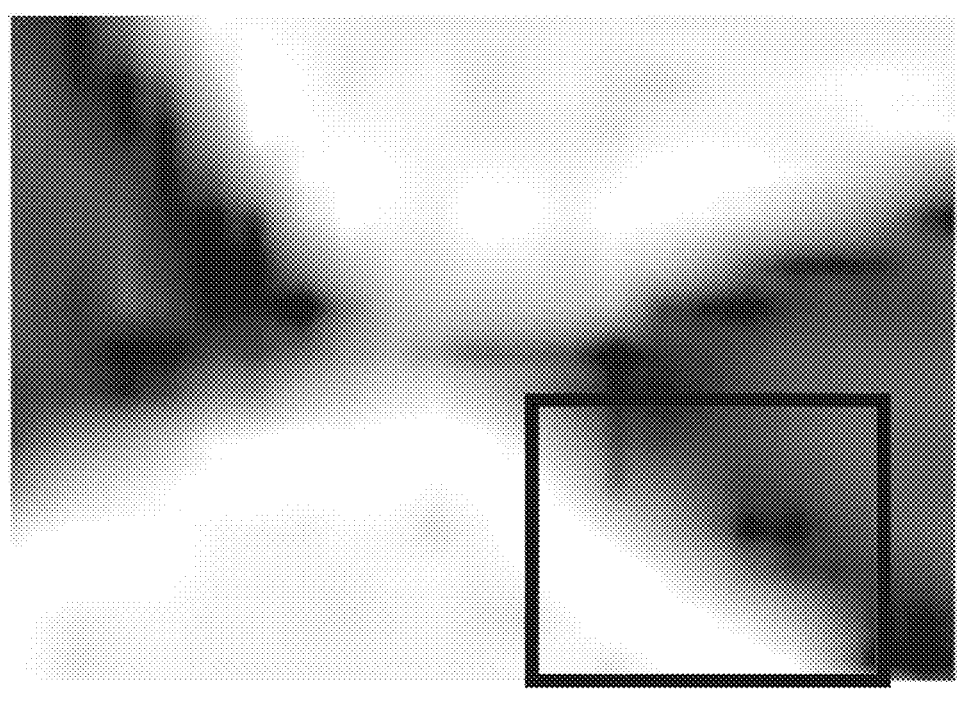
FIG. 2B is an enlarged view of the dashed frame in FIG. 2A.
Figure 2A:
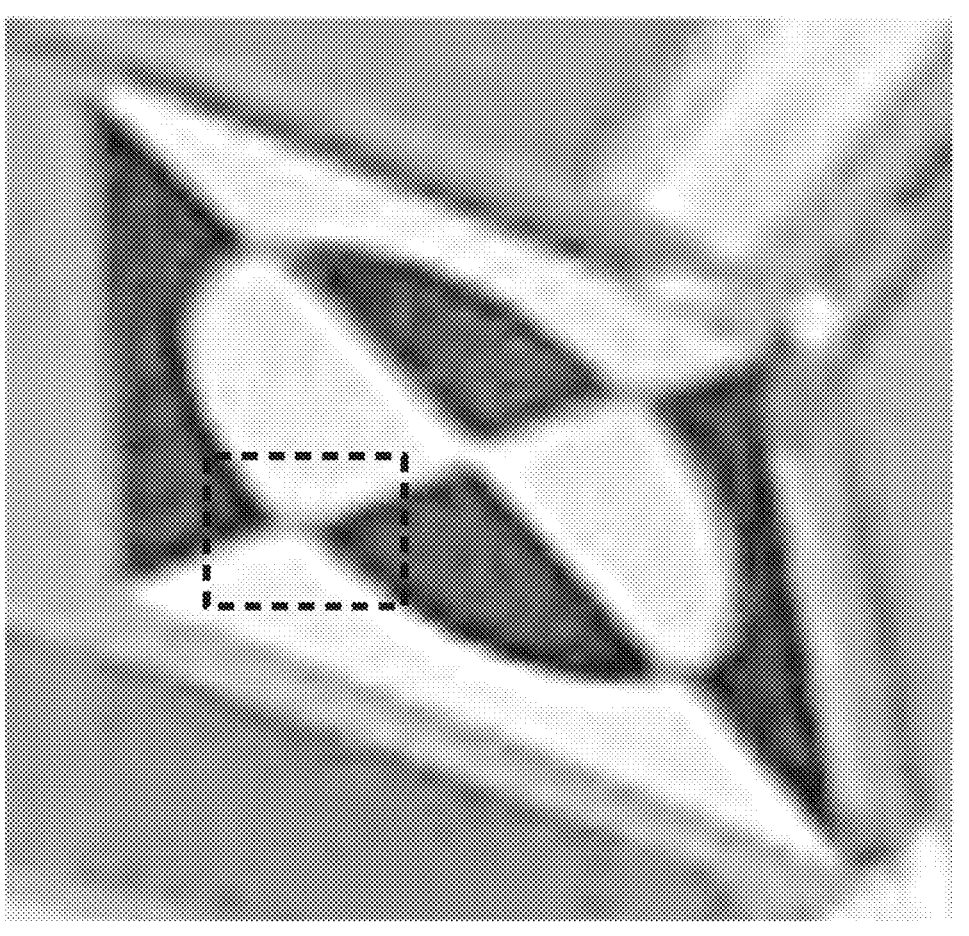
FIG. 2A is an example of a captured image of a target in a state where neither dynamic range processing nor edge enhancement processing is relaxed.

FIG. 2A is an example of a captured image of a target with normal dynamic range processing and edge enhancement processing (neither relaxed) for viewing by the vehicle occupant. FIG. 2B is an enlarged view of the dashed frame in FIG. 2A. When the captured image of the target in FIG. 2A is displayed on the in-vehicle display, the vehicle occupant can easily view the captured image. However, when adjusting the optical axis of the onboard camera 2 using the captured image, the results of such image processing may become noise. For example, as shown in FIG. 2B, the boundary between white and black is not a uniform brightness transition, and shading occurs depending on the position in the captured image, which may become noise in detecting the target position.

Therefore, the onboard imaging device 1 is configured to relax at least one of the dynamic range processing and the edge enhancement processing when the onboard camera 2 is in the optical axis adjustment mode, compared to when the onboard camera 2 is not in the optical axis adjustment mode. Here, the onboard imaging device 1 is configured to switch between the optical axis adjustment mode and a normal mode. The optical axis adjustment mode is a mode for adjusting the optical axis deviation caused by installation tolerances of the onboard camera 2 on the vehicle, for example. The normal mode corresponds to a state where the optical axis adjustment mode is not activated and is a mode in which the captured image can be displayed on the in-vehicle display for viewing by the vehicle occupant.

The optical axis adjustment mode can be specified as a type of user-specified mode to the ECU 10 by a user such as an operator performing the optical axis adjustment using an external tool, for example. The user-specified mode means a mode specified by the user to the ECU 10 from among a plurality of modes including the optical axis adjustment mode and the normal mode. The external tool is a device connected to the vehicle that can transmit a command signal to the ECU 10 to select the user-specified mode. The external tool may be a communication facility with the vehicle provided at a production factory during vehicle production. After vehicle sales, the external tool may be a service tool provided at a dealer's maintenance factory. The external tool may be a genuine navigation device that can be switched to a service mode.

The ECU 10 controls the onboard camera 2 to perform image processing including dynamic range processing and edge enhancement processing applied to the captured image of the onboard camera 2. The ECU 10 controls the onboard camera 2 to relax at least one of the dynamic range processing and the edge enhancement processing when the onboard camera 2 is in the optical axis adjustment mode, compared to when the onboard camera 2 is not in the optical axis adjustment mode. The ECU 10 includes a storage unit 11, a mode recognition unit 12, and a setting information transmission unit 13.

The storage unit 11 stores setting information for relaxing the dynamic range processing and the edge enhancement processing. The storage unit 11 stores, for example, setting ID numbers corresponding to the optical axis adjustment mode and the normal mode to be transmitted to the onboard camera 2. The storage unit 11 may store a normal setting information of the dynamic range processing and the edge enhancement processing for the normal mode.

The setting ID numbers may include, for example, an ID1 for the normal mode, an ID2 corresponding to a first relaxation setting (first setting), and an ID3 corresponding to a second relaxation setting (second setting). The first relaxation setting and the second relaxation setting are setting information (relaxation settings) for the optical axis adjustment mode. The second relaxation setting has a smaller degree of relaxation than the first relaxation setting. "Smaller degree of relaxation" means closer to the normal mode than the first relaxation setting.

Relaxation of the dynamic range processing means, for example, disabling the dynamic range processing. Relaxation of the dynamic range processing may also mean changing the weighting of the superimposition of the bright captured image and the dark captured image.

Relaxation of the edge enhancement processing means, for example, reducing the gain for correcting to make the brightness change appear larger than the brightness change actually is. Relaxation of the edge enhancement processing may also mean disabling the edge enhancement processing by setting the gain to zero.

The storage unit 11 may store image processing setting values (for example, WDR setting values and edge processing setting values) corresponding to the types of onboard cameras 2 instead of storing the setting ID numbers corresponding to the optical axis adjustment mode and the normal mode. The image processing setting values may include normal WDR setting value and normal edge processing setting value for the normal mode, first relaxation WDR setting value and first relaxation edge processing setting value for the first relaxation setting, and second relaxation WDR setting value and second relaxation edge processing setting value for the second relaxation setting.

The mode recognition unit 12 recognizes the type of user-specified mode based on a command signal input to the ECU 10.

The setting information transmission unit 13 determines whether the type of user-specified mode is the optical axis adjustment mode and transmits the setting information to the onboard camera 2 according to the determination result.

For example, the setting information transmission unit 13 transmits the setting ID number for the normal mode (for example, ID1) as the setting information for the normal mode to the onboard camera 2 when the type of user-specified mode is not the optical axis adjustment mode. The setting information transmission unit 13 transmits the setting ID number corresponding to the first relaxation setting (for example, ID2) as the setting information of the first relaxation setting for the optical axis adjustment mode to the onboard camera 2, when the type of user-specified mode is the optical axis adjustment mode.

The ECU 10 may adjust the optical axis using the captured image processed with the image processing in which at least one of the dynamic range processing and the edge enhancement processing is relaxed with the second relaxation setting having a smaller degree of relaxation than the first relaxation setting, if the target position for adjusting the optical axis cannot be recognized using the captured image processed with the image processing in which at least one of the dynamic range processing and the edge enhancement processing is relaxed with the first relaxation setting, in the optical axis adjustment mode of the onboard camera 2. For example, the setting information transmission unit 13 may transmit the setting ID number corresponding to the second relaxation setting (for example, ID3) as the setting information of the second relaxation setting for the optical axis adjustment mode to the onboard camera 2, if the target position for adjusting the optical axis cannot be recognized using the captured image processed with the image processing in which at least one of the dynamic range processing and the edge enhancement processing is relaxed with the first relaxation setting, in the optical axis adjustment mode of the onboard camera 2.

The setting information transmission unit 13 may transmit setting values for relaxing at least one of the dynamic range processing and the edge enhancement processing to the onboard camera 2 based on a type ID number of the onboard camera 2 received from the onboard camera 2. In this case, the pre-stored setting values are switched to correspond to the type of the onboard camera 2 based on the type ID number of the onboard camera 2 received from the onboard camera 2, and transmitted to the onboard camera 2. This allows ECUs to be standardized by pre-storing setting values corresponding to multiple types of onboard cameras 2 in one type of ECU 10, for applying the present disclosure to multiple types of onboard cameras 2 with different specifications, such as individual vehicle setting information described later.

For example, the setting information transmission unit 13 may transmit normal WDR setting value and normal edge processing setting value for the type ID number of the onboard camera 2 as the setting information for the normal mode to the onboard camera 2, based on the type ID number of the onboard camera 2 received from the onboard camera 2, when the type of user-specified mode is not the optical axis adjustment mode.

The setting information transmission unit 13 may transmit the first relaxation WDR setting value and the first relaxation edge processing setting value for the type ID number of the onboard camera 2 as the setting information for the first relaxation setting to the onboard camera 2, based on the type ID number of the onboard camera 2 received from the onboard camera 2, when the type of user-specified mode is the optical axis adjustment mode.

The setting information transmission unit 13 may transmit the second relaxation WDR setting value and the second relaxation edge processing setting value for the type ID number of the onboard camera 2 as the setting information for the second relaxation setting to the onboard camera 2, in response to a request from the onboard camera 2, if the target position for adjusting the optical axis cannot be recognized using the captured image processed with the image processing in which at least one of the dynamic range processing and the edge enhancement processing is relaxed with the first relaxation setting, in the optical axis adjustment mode of the onboard camera 2.

The onboard camera 2 includes a memory unit 21, an imaging unit 22, an image processing unit 23, and an optical axis adjustment unit 24.

The memory unit 21 stores various setting information of the onboard camera 2. The setting information includes setting values corresponding to the setting ID numbers for image processing including dynamic range processing and edge enhancement processing. The setting information may include individual vehicle setting information such as the type of camera, camera constants, camera position, and camera orientation. The individual vehicle setting information may be determined based on the vehicle model, the fixed position of the onboard camera 2 in the vehicle, or the fixing method of the onboard camera 2. When the setting ID number is transmitted from the ECU 10 as the setting information, the setting values for image processing are read from the memory unit 21 according to the setting ID number transmitted from the ECU 10. When the setting values are transmitted from the ECU 10 as the setting information, the setting values of the memory unit 21 may not be read.

The imaging unit 22 includes, for example, a lens and a sensor. The imaging unit 22 captures an image of the surroundings of the vehicle with the adjusted optical axis.

The image processing unit 23 performs the above-described image processing on the captured image of the imaging unit 22 based on the setting information read from the memory unit 21. The image processing unit 23 may perform the above-described image processing on the captured image of the imaging unit 22 based on the setting information transmitted from the ECU 10.

The optical axis adjustment unit 24 recognizes the target position from the captured image of the target and adjusts the optical axis based on the target position in the optical axis adjustment mode. The optical axis adjustment unit 24 has a calculation function for recognizing the target position. The optical axis adjustment unit 24 may have an actuator for adjusting the optical axis.

Figure 3B:
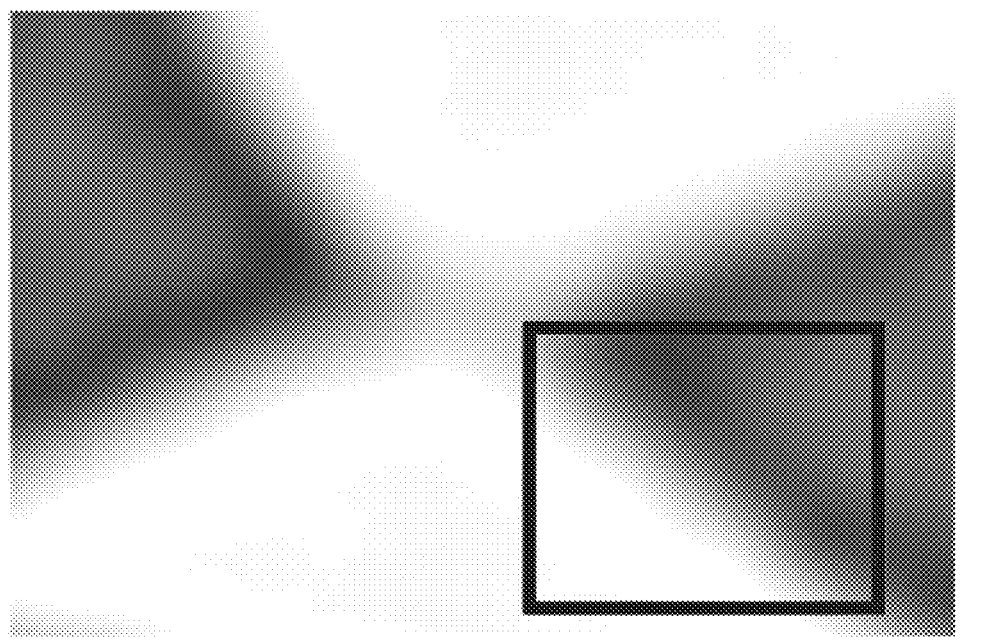
FIG. 3B is an enlarged view of the dashed frame in FIG. 3A.
Figure 3B:
Figure 3A:
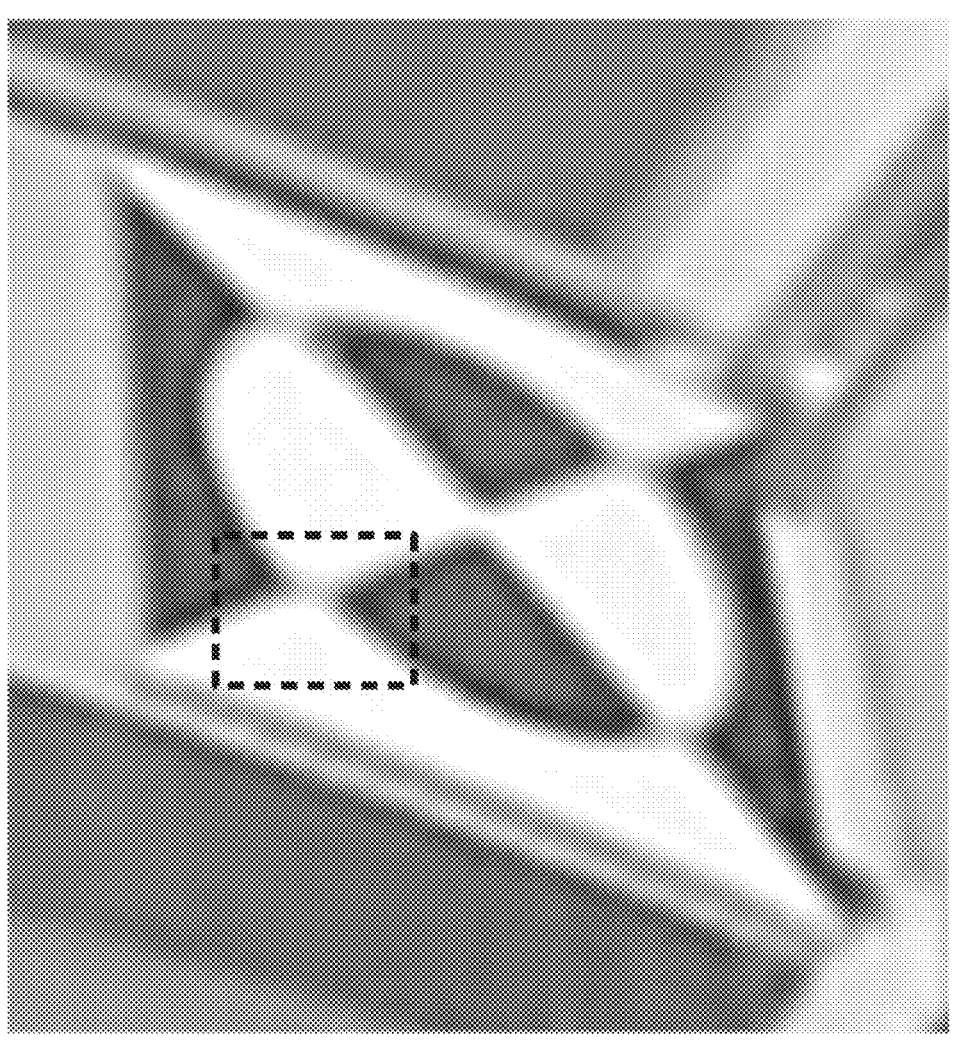
FIG. 3A is an example of a captured image of the target in a state where the dynamic range processing is relaxed.

FIG. 3A is an example of a captured image of the target in a state where the dynamic range processing is relaxed. FIG. 3B is an enlarged view of the dashed frame in FIG. 3A. As shown in FIG. 3A and FIG. 3B, by relaxing the dynamic range processing, the shading along the boundary between white and black as in the example of FIG. 2B is suppressed, and the noise in detecting the target position is reduced. By using the captured image with reduced noise, the optical axis adjustment of the onboard camera 2 is optimized.

[Processing of Onboard Imaging Device]

Figure 4:
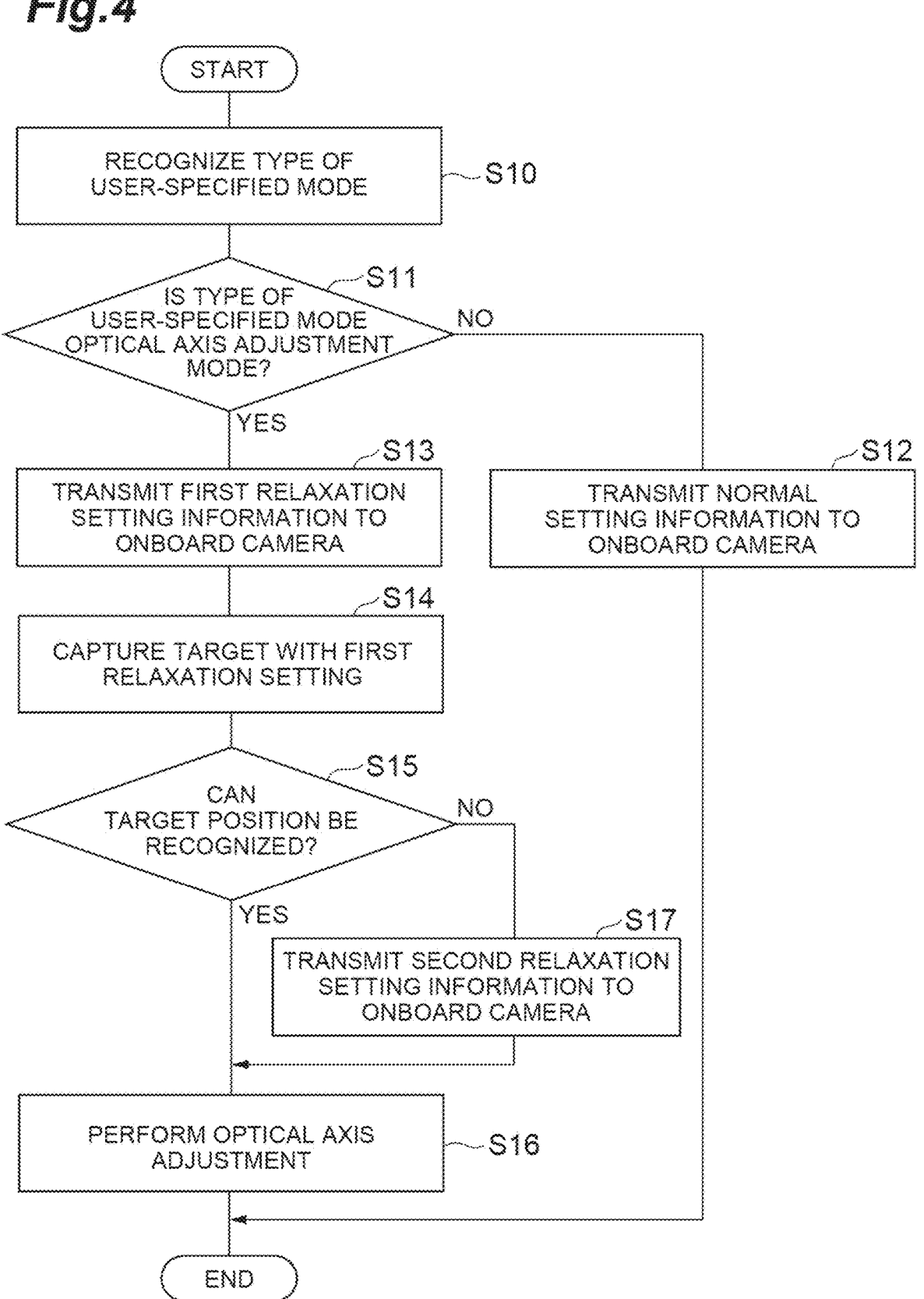
FIG. 4 is a flowchart illustrating an example of processing in the onboard imaging device of FIG. 1.

Next, an example of processing of the onboard imaging device 1 will be described with reference to the flowchart of FIG. 4. FIG. 4 is a flowchart illustrating an example of processing of the onboard imaging device of FIG. 1. The process shown in FIG. 4 is repeatedly executed at a predetermined calculation cycle, for example, while the vehicle is stopped.

As shown in FIG. 4, the onboard imaging device 1 recognizes the type of user-specified mode by the mode recognition unit 12 of the ECU 10 in S10. The mode recognition unit 12 recognizes the type of user-specified mode based on a command signal input to the ECU 10.

In S11, the onboard imaging device 1 determines whether the type of user-specified mode is the optical axis adjustment mode by the setting information transmission unit 13 of the ECU 10. If the type of user-specified mode is not the optical axis adjustment mode (S11: NO), the onboard imaging device 1 proceeds to processing of S12.

In S12, the onboard imaging device 1 transmits the setting information for the normal mode to the onboard camera by the setting information transmission unit 13 of the ECU 10. The setting information transmission unit 13 of the ECU 10 transmits the setting ID number for the normal mode (for example, ID1) as the setting information for the normal mode to the onboard camera 2. Alternatively, the setting information transmission unit 13 of the ECU 10 may transmit the normal WDR setting value and the normal edge processing setting value for the type ID number of the onboard camera 2 as the setting information for the normal mode to the onboard camera 2, based on the type ID number of the onboard camera 2 received from the onboard camera 2. Thereafter, the onboard imaging device 1 ends the process of FIG. 4 for the current calculation cycle.

On the other hand, if the type of user-specified mode is the optical axis adjustment mode (S11: YES), the onboard imaging device 1 proceeds to processing of S13. In S13, the onboard imaging device 1 transmits the setting information for the first relaxation setting to the onboard camera by the setting information transmission unit 13 of the ECU 10. The setting information transmission unit 13 of the ECU 10 transmits the setting ID number corresponding to the first relaxation setting (for example, ID2) as the setting information of the first relaxation setting for the optical axis adjustment mode to the onboard camera 2. Alternatively, the setting information transmission unit 13 of the ECU 10 may transmit the first relaxation WDR setting value and the first relaxation edge processing setting value for the type ID number of the onboard camera 2 as the setting information for the first relaxation setting to the onboard camera 2, based on the type ID number of the onboard camera 2 received from the onboard camera 2.

In S14, the onboard imaging device 1 captures the target with the first relaxation setting using the imaging unit 22 by the optical axis adjustment unit 24 of the onboard camera 2. The optical axis adjustment unit 24 of the onboard camera 2 reads the WDR setting value and the edge processing setting value corresponding to the setting ID number for the first relaxation setting from the memory unit 21 of the onboard camera 2 and captures the target using these read setting values. Alternatively, the optical axis adjustment unit 24 of the onboard camera 2 may capture the target using the first relaxation WDR setting value and the first relaxation edge processing setting value received from the ECU 10.

In S15, the onboard imaging device 1 determines whether the target position can be recognized by the optical axis adjustment unit 24 of the onboard camera 2. If the target position can be recognized (S15: YES), the onboard imaging device 1 proceeds to processing of S16. In S16, the onboard imaging device 1 performs the optical axis adjustment by the optical axis adjustment unit 24 of the onboard camera 2. In this case, the optical axis adjustment unit 24 performs the optical axis adjustment using the captured image of the target captured with the first relaxation setting. Thereafter, the onboard imaging device 1 ends the process of FIG. 4 for the current calculation cycle.

On the other hand, if the target position cannot be recognized (S15: NO), the onboard imaging device 1 proceeds to processing of S17. In S17, the onboard imaging device 1 transmits the setting information for the second relaxation setting to the onboard camera by the setting information transmission unit 13 of the ECU 10. In S17, the onboard imaging device 1, for example, transmits information requesting the setting information for the second relaxation setting to the setting information transmission unit 13 of the ECU 10 by the optical axis adjustment unit 24 of the onboard camera 2. The setting information transmission unit 13 of the ECU 10 transmits the setting ID number corresponding to the second relaxation setting (for example, ID3) as the setting information of the second relaxation setting for the optical axis adjustment mode to the onboard camera 2, in response to the request from the onboard camera 2. Alternatively, the setting information transmission unit 13 of the ECU 10 may transmit the second relaxation WDR setting value and the second relaxation edge processing setting value for the type ID number of the onboard camera 2 as the setting information for the second relaxation setting to the onboard camera 2, in response to the request from the onboard camera 2.

In S16 after S17, the onboard imaging device 1 performs the optical axis adjustment by the optical axis adjustment unit 24 of the onboard camera 2. In this case, the optical axis adjustment unit 24 performs the optical axis adjustment using the captured image of the target captured with the second relaxation setting. Thereafter, the onboard imaging device 1 ends the process of FIG. 4 for the current calculation cycle.

According to the onboard imaging device 1 described above, the onboard camera 2 is controlled to relax the dynamic range processing and the edge enhancement processing when the onboard camera 2 is in the optical axis adjustment mode, compared to when the onboard camera 2 is not in the optical axis adjustment mode. This reduces the impact of image processing applied to make the captured images easier for the vehicle occupant to view on the in-vehicle display, when using the captured images to adjust the optical axis of the onboard camera 2. Therefore, according to the onboard imaging device 1, it is possible to optimize the optical axis adjustment of the onboard camera 2 that performs image processing to make the captured images easier for the vehicle occupant to view on the in-vehicle display.

In the onboard imaging device 1, the ECU 10 adjusts the optical axis using the captured image processed with the image processing in which the dynamic range processing and the edge enhancement processing are relaxed with the second relaxation setting having a smaller degree of relaxation than the first relaxation setting, if the target position for adjusting the optical axis cannot be recognized using the captured image processed with the image processing in which the dynamic range processing and the edge enhancement processing are relaxed with the first relaxation setting, in the optical axis adjustment mode of the onboard camera 2. This allows the optical axis adjustment to continue by switching to the second relaxation setting with a smaller degree of relaxation than the first relaxation setting, if the target position cannot be recognized due to, for example, white-out in the captured image processed with the image processing relaxed with the first relaxation setting.

Although the example of the present disclosure has been described above, the present disclosure is not limited to the above-described example.

In the above-described example, both the dynamic range processing and the edge enhancement processing are relaxed in the description of the flowchart of FIG. 4, but the present disclosure is not limited to this example. Specifically, in S13 and S17 of FIG. 4, the setting information transmission unit 13 of the ECU 10 transmits the setting ID numbers (ID2, ID3) or the first and second relaxation WDR setting values and the first and second relaxation edge processing setting values to the onboard camera 2 as the first and second relaxation settings, but the present disclosure is not limited to this example. For example, it may be the transmission of either the WDR setting values or the edge processing setting values, instead of both the WDR setting values and the edge processing setting values. In short, the onboard imaging device 1 is configured to relax at least one of the dynamic range processing and the edge enhancement processing when the onboard camera 2 is in the optical axis adjustment mode, compared to when the onboard camera 2 is not in the optical axis adjustment mode.

In the above-described example, the first and second relaxation WDR setting values and the first and second relaxation edge processing setting values are switched according to whether the target position can be recognized in the description of the flowchart of FIG. 4, but the present disclosure is not limited to this example. For example, the processes of S14, S15, and S17 in the flowchart of FIG. 4 may be omitted.

In the above-described example, the onboard camera 2 and the ECU 10 are configured for a panoramic view monitor, but they may be configured for autonomous driving control or driving support control. In this case, the onboard camera may be provided on the back side of a windshield of the vehicle, for example.

What is claimed is:

1. An onboard imaging device for capturing a situation around a vehicle, comprising:

an onboard camera provided on the vehicle and directed towards a surrounding of the vehicle; and a control unit configured to control the onboard camera to perform image processing including dynamic range processing and edge enhancement processing applied to a captured image captured by the onboard camera, wherein the onboard camera has an optical axis adjustment mode for adjusting an optical axis using the captured image, and the control unit controls the onboard camera to relax at least one of the dynamic range processing and the edge enhancement processing when the onboard camera is in the optical axis adjustment mode, compared to when the onboard camera is not in the optical axis adjustment mode.

2. The onboard imaging device according to claim 1, wherein the control unit, in the optical axis adjustment mode of the onboard camera, adjusts the optical axis using the captured image processed with the image processing in which at least one of the dynamic range processing and the edge enhancement processing is relaxed with a first setting, and adjusts the optical axis using the captured image processed with the image processing in which at least one of the dynamic range processing and the edge enhancement processing is relaxed with a second setting having a smaller degree of relaxation than the first setting, if a target position for adjusting the optical axis cannot be recognized using the captured image processed with the image processing in which at least one of the dynamic range processing and the edge enhancement processing is relaxed with the first setting.

* * * * *